US012650045B1

(12) United States Patent
Fiset et al.

(10) Patent No.: US 12,650,045 B1
(45) Date of Patent: Jun. 9, 2026

(54) FENESTRATION UNIT WITH SASH SUPPORTED FOR GLIDING MOVEMENT AND LATERAL MOVEMENT WITHIN A FRAME

(71) Applicant: JELD-WEN, Inc., Charlotte, NC (US)

(72) Inventors: Dominique Fiset, Neuville (CA); Jeff Pigeon, Peterborough (CA); Lisa Bergeron, Levis (CA); Sylvain LaCasse, Quebec (CA); Frederic Renaud, Levis (CA); Jeff Baker, Pentanguishene (CA); Jean Marois, Prevost (CA)

(73) Assignee: JELD-WEN, Inc.

( * ) Notice: Subject to any disclaimer, the term of this patent is extended or adjusted under 35 U.S.C. 154(b) by 0 days.

(21) Appl. No.: 19/085,486

(22) Filed: Mar. 20, 2025

Related U.S. Application Data

(60) Provisional application No. 63/751,521, filed on Jan. 30, 2025.

(51) Int. Cl.
*E05D 15/10* (2006.01)

(52) U.S. Cl.
CPC .. *E05D 15/1042* (2013.01); *E05D 2015/1055* (2013.01); *E05D 2015/106* (2013.01)

(58) Field of Classification Search
CPC .... E05D 2015/1055; E05D 2015/1057; E05D 2015/106
See application file for complete search history.

(56) References Cited

U.S. PATENT DOCUMENTS 1,975,187 A * 10/1934 Aberle .................. E06B 3/5063 49/128
2,493,162 A 1/1950 Olds
2,992,460 A * 7/1961 Hentges ................ E06B 3/4672 49/130

(Continued)

FOREIGN PATENT DOCUMENTS

DE 4402464 C1 * 5/1995 ......... E05D 15/1042
EP 0643191 A1 * 3/1995 ......... E05D 15/1042

(Continued)

OTHER PUBLICATIONS

WP00351-04-1-2; Gretsch-Unitas GmbH; Nov. 2012; www.g-u.com "Parallel-Slide hardware—the hardware solution for properties with changing users".

*Primary Examiner* — Catherine A Kelly
(74) *Attorney, Agent, or Firm* — Ingrassia Fisher & Lorenz, LLP

(57) ABSTRACT

A fenestration unit includes a frame and a sash. The sash includes a glide support member and a projection. The frame includes a frame member that is elongate. The frame member at least partly defines a panel seat that opposes the panel peripheral area when the sash closed, a support track configured to engage and support the glide support member for gliding movement of the sash, and a guide channel that receives the projection to guide gliding movement of the sash. The frame member includes a diverter channel extending between the panel seat and the guide channel and is configured to receive the projection to guide movement of the sash. The frame member includes a recess providing clearance between the frame member and the glide support member as the sash moves.

20 Claims, 8 Drawing Sheets

(56) References Cited

U.S. PATENT DOCUMENTS 3,855,732 A 12/1974 Sheaf
4,098,027 A 7/1978 Crance
4,565,031 A * 1/1986 Sakamoto ........... E05D 15/1042 49/130
4,573,286 A 3/1986 Favrel et al.
4,639,970 A 2/1987 Adams
4,688,352 A 8/1987 Kinoshita
4,697,384 A * 10/1987 Tutikawa ............ E05D 15/1042 49/130
5,022,454 A 6/1991 Kobayashi et al.
5,090,171 A 2/1992 Kano et al.
5,189,837 A * 3/1993 Ienaga .................. E06B 3/4627 49/214
5,272,839 A * 12/1993 Karhu ..................... E06B 3/924 49/410
5,309,675 A * 5/1994 Shen ................... E05D 15/1042 49/213
5,351,442 A 10/1994 Gingras
5,461,829 A 10/1995 Lehto et al.
5,613,323 A * 3/1997 Buening ................ B60J 1/1853 49/130
5,749,172 A * 5/1998 Isopahkala .............. E05D 15/58 49/127
6,052,944 A 4/2000 Maehara
6,497,072 B2 12/2002 Fries
6,691,462 B2 * 2/2004 Oestermann ............ E05D 15/58 49/213
6,718,695 B1 4/2004 Park
6,826,867 B1 12/2004 McDonald et al.
6,840,009 B2 * 1/2005 Ronay ................. E05D 15/0608 49/128
7,021,007 B2 4/2006 Jacobs
7,024,821 B2 4/2006 Lu
7,143,474 B2 12/2006 Welsch et al.
7,165,497 B2 1/2007 Gilbert et al.
7,506,773 B2 3/2009 Welsch et al.
7,610,718 B2 11/2009 Kopish
7,647,728 B2 1/2010 Bortoluzzi
7,647,729 B2 1/2010 Polus
7,735,190 B2 6/2010 Welsch et al.
7,980,027 B2 * 7/2011 Kraus ................. E05D 15/0686 49/213
8,434,946 B2 5/2013 Watson
8,469,437 B2 * 6/2013 Zanetti .................. E05F 15/632 49/404
8,533,997 B2 9/2013 Stoutenborough et al.
8,806,807 B2 * 8/2014 Rees ....................... E05D 15/48 49/257
8,894,284 B2 11/2014 Watson
9,470,028 B2 10/2016 Header et al.
9,637,961 B2 5/2017 Header
9,739,080 B2 8/2017 Yoon et al.
10,119,315 B2 * 11/2018 Schneider ............... E05D 15/58
10,822,863 B2 11/2020 Bernhagen
10,982,477 B2 4/2021 Procton
11,371,277 B2 6/2022 Meyer
2002/0053166 A1 5/2002 Fries
2004/0159048 A1 8/2004 Jacobs
2008/0066384 A1 3/2008 Yu
2010/0050530 A1 * 3/2010 Blasi ................... E05D 15/1042 49/358
2013/0312333 A1 11/2013 Liao
2016/0076293 A1 3/2016 Halfon et al.
2018/0266169 A1 9/2018 Wray et al.

FOREIGN PATENT DOCUMENTS

EP 1400653 B1 3/2005
EP 1966463 B1 4/2016
FR 2603939 A1 * 3/1988 ........... E06B 3/4672
FR 3011266 A1 * 4/2015 ........... E05D 15/066
GB 589368 A * 6/1947 ......... E05D 15/1042
GB 2194578 A * 3/1988 ......... E05D 15/1042
WO 2014021641 A1 2/2014

* cited by examiner

FENESTRATION UNIT WITH SASH SUPPORTED FOR GLIDING MOVEMENT AND LATERAL MOVEMENT WITHIN A FRAME

TECHNICAL FIELD

The following generally relates to fenestration units and, more particularly, relates to a fenestration unit with a sash supported for gliding movement and lateral movement within a frame.

BACKGROUND

It is known to provide fenestration units of various types. Many fenestration units include an operating sash that is moveable between a closed position and an open position and back.

However, fenestration units may suffer from certain disadvantages. For example, fenestration units may have relatively limited thermal performance. For example, gliding windows and doors (i.e., sliding windows and doors) may include an operating sash, and even when closed, the fenestration unit may allow significant thermal energy transfer, for example, proximate the peripheral edge of the sash, near a mullion joint with another sash, etc. Features may be included to improve thermal performance; however, providing these features may increase part cost, part complexity, part count, manufacturing time, and the like. Also, these added features may make the operating sash more difficult to actuate when opening and/or closing the sash. Furthermore, these features may make the sash less user-friendly.

Accordingly, it is desirable to provide a fenestration unit (e.g., a gliding or sliding fenestration unit) with improved thermal performance. It is also desirable to provide such a fenestration unit that can also be manufactured efficiently with a low part count, low manufacture time, inexpensive parts, etc. Furthermore, it is desirable to provide such a fenestration unit that is user-friendly and allows for ease of operation. Other desirable features and characteristics will become apparent from the subsequent detailed description and the appended claims, taken in conjunction with the accompanying drawings and this background.

BRIEF SUMMARY

In an example embodiment, a fenestration unit is disclosed that includes a frame that defines a first axis, a second axis, and a third axis. The third axis extends through the frame, and the third axis is perpendicular to the first axis. The fenestration unit includes a sash supported for movement within the frame between a first position and a second position. The sash is displaced along the first axis during movement between the first position and the second position. The sash has an intermediate position in which the sash is disposed in the frame between the first position and the second position. The sash includes a panel peripheral area, a glide support member that projects a first fixed distance from the panel peripheral area along the second axis, and a projection that projects a second fixed distance from the panel peripheral area along the second axis. The frame includes a frame member that is elongate and extends along the first axis. The frame member at least partly defines a panel seat that opposes the panel peripheral area when the sash is in the first position, a support track configured to engage and support the glide support member for gliding movement of the sash between the intermediate position and the second position, and a guide channel that receives the projection to guide gliding movement of the sash between the intermediate position and the second position. The frame member includes a diverter channel extending between the panel seat and the guide channel and is configured to receive the projection to guide movement of the sash between the first position and the intermediate position. The frame member includes a recess providing clearance between the frame member and the glide support member as the sash moves between the first position and the intermediate position.

In another example embodiment, a method of a fenestration unit is disclosed. The method includes providing a frame that defines a first axis, a second axis, and a third axis, the third axis extending through the frame, and the third axis being perpendicular to the first axis. The method also includes supporting a sash for movement within the frame between a first position and a second position. The sash is displaced along the first axis during movement between the first position and the second position. The sash has an intermediate position in which the sash is disposed in the frame between the first position and the second position. The sash includes a panel peripheral area, a glide support member that projects a first fixed distance from the panel peripheral area along the second axis, and a projection that projects a second fixed distance from the panel peripheral area along the second axis. Also, the frame includes a frame member that is elongate and extends along the first axis. The frame member at least partly defines a panel seat that opposes the panel peripheral area when the sash is in the first position, a support track configured to engage and support the glide support member for gliding movement of the sash between the intermediate position and the second position, and a guide channel that receives the projection to guide gliding movement of the sash between the intermediate position and the second position. The frame member includes a diverter channel extending between the panel seat and the guide channel and configured to receive the projection to guide movement of the sash between the first position and the intermediate position. The frame member includes a recess providing clearance between the frame member and the glide support member as the sash moves between the first position and the intermediate position.

In an additional embodiment, a fenestration unit is disclosed that includes a rectangular frame that defines a first axis, a second axis, and a third axis. The third axis extends through the frame, and the third axis is straight and perpendicular to the first axis. The third axis is perpendicular to the second axis. The fenestration unit also includes a sash supported for movement within the frame between a closed position and an open position. The sash is displaced along the first axis during movement between the closed position and the open position. The sash has an intermediate position in which the sash is disposed in the frame between the closed position and the open position. The sash includes a rectangular panel with a panel peripheral area that includes a first corner and a second corner that are separated along the first axis. The sash includes a first glide support member and a first projection disposed proximate the first corner. The sash includes a second glide support member and a second projection disposed proximate the second corner. The first glide support member, the first projection, the second glide support member, and the second projection project a respective fixed distance from the panel peripheral area along the second axis. The frame includes a sill member that is elongate and extends along the first axis. The sill member at least partly defines a panel seat that opposes the panel peripheral area when the sash is in the closed position, a support track configured to engage and support the first glide support member and the second glide support member for gliding movement of the sash between the intermediate position and the open position, and a guide channel that receives the first projection and the second projection to guide gliding movement of the sash between the intermediate position and the open position. The sill member includes a first diverter member with a first diverter channel that is elongate to extend substantially parallel to the third axis between the panel seat and the guide channel and configured to receive the first projection to guide movement of the sash between the closed position and the intermediate position. The first diverter member includes a recess providing clearance between the frame member and the first glide support member as the sash moves between the closed position and the intermediate position. The sill member includes a second diverter member with a second diverter channel that is elongate to extend at a positive angle relative to the first axis between the panel seat and the guide channel and configured to receive the second projection to guide movement of the sash between the closed position and the intermediate position.

BRIEF DESCRIPTION OF DRAWINGS

The various embodiments will hereinafter be described in conjunction with the following drawing figures, wherein like numerals denote like elements, and wherein.

DETAILED DESCRIPTION

Figure 1:
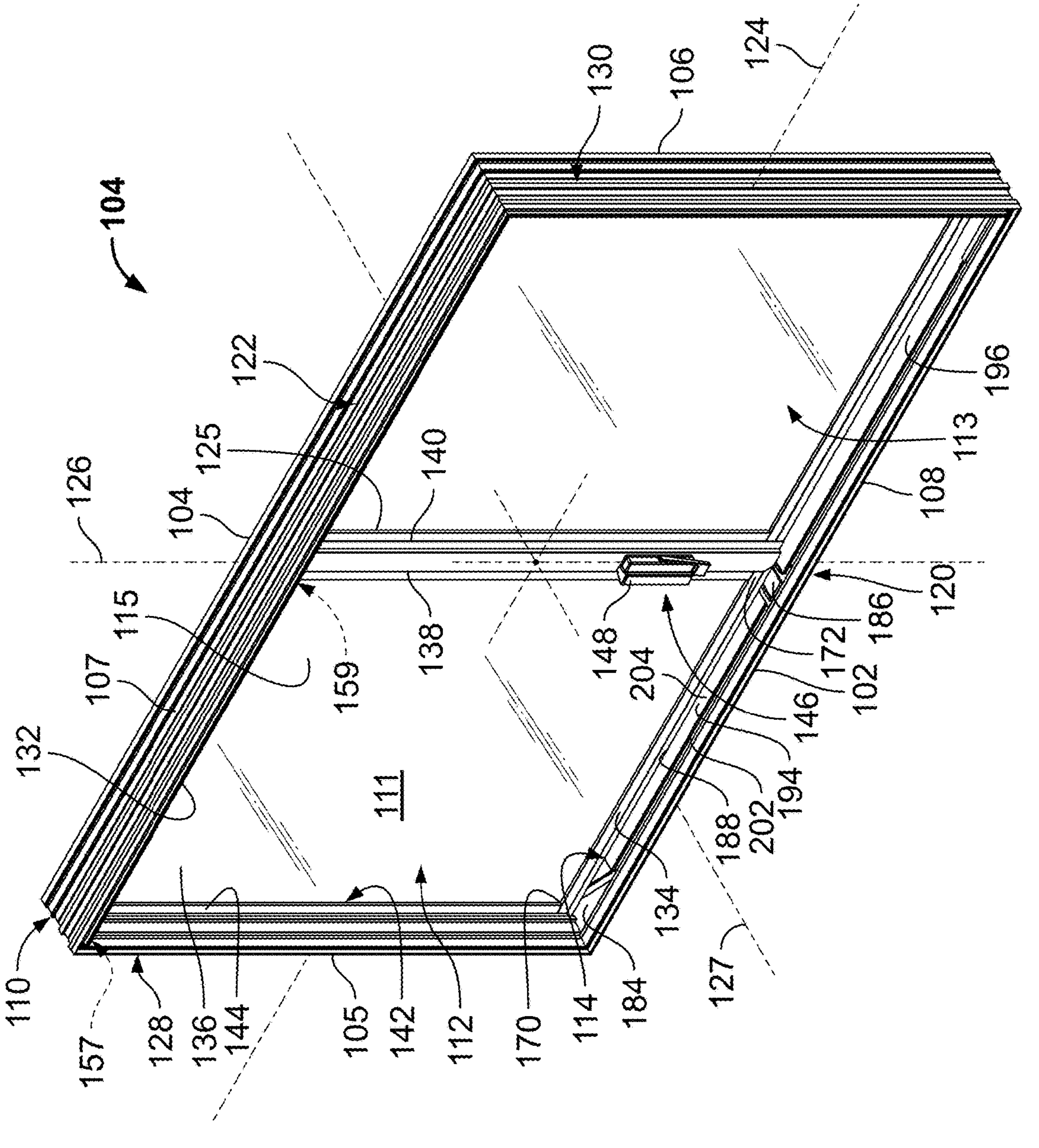
FIG. 1 is a perspective view of a fenestration unit with a sash in a closed position according to example embodiments of the present disclosure.

The following Detailed Description is merely exemplary in nature and is not intended to limit the various embodiments or the application and uses thereof. Furthermore, there is no intention to be bound by any theory presented in the preceding background or the following detailed description.

Broadly, example embodiments disclosed herein include fenestration units, such as fenestration units with a gliding (i.e., sliding) operating sash that is moveable within a frame along a gliding direction (i.e., sliding direction, longitudinally within the frame, etc.). The operating sash may move thusly, relative to another sash supported within the frame. In some embodiments, the operating sash may be supported in the frame for horizontal gliding (i.e., sliding movement) to move between a closed position and an open position. In the closed position the operating sash may be disposed adjacent one edge of the other sash (e.g., at a mullion joint), and in the open position, the operating sash may overlap the other sash.

Moreover, the fenestration unit may include a support system that supports and guides movement of the sash and provides additional freedom of movement of the sash within the frame. For example, in addition to gliding (i.e., sliding movement), the support system may support the sash for movement in a lateral direction (i.e., along an axis directed through the frame) as the sash moves between the open and closed positions. The support system may also provide the operating sash with support for a degree of rotational movement of one edge of the sash about another axis (e.g., a vertical axis) within the frame, thereby allowing the opposite edge of the sash to move laterally as the sash moves between the open and closed positions.

The support system may be cooperatively defined by one or more features on the frame and one or more corresponding features on the sash. Corresponding features may engage, moveably couple, support, cooperatively operate, or otherwise interact to provide the fenestration unit with the improvements discussed herein. In some embodiments, the frame may include a glide track, and the sash may include a glide support member that glides (slides) along the glide track during movement of the sash. Additionally, the frame may include a guide channel, and the sash may include a projection (e.g., a pin, etc.) that is received within the guide channel for guided movement of the sash. Also, the support system may include a plurality of support features, such as a plurality of such projections that are received in respective portions of the guide channel. The guide channel may include linear, straight portions that extend along the gliding direction and other diverter portions that allow the sash to divert in its movement within the frame. Furthermore, the support system may include a plurality of glide support members and the frame may include features, such as recesses, contoured surfaces, etc. that accommodate the glide support members as the sash moves between the open and closed positions.

In some embodiments, the frame may include a sill that extends horizontally and the sill may include the glide track and the guide channel. Moreover, the sill may include diverter members for diverting movement of the sash in the lateral direction, etc. The diverter members may be removably attached to the sill and may be arranged relative to linear, straight portions of the guide channel and glide track. The diverter members may include portions of the guide channel that receive the projection(s) of the sash for guiding lateral movement of the sash within the frame. At least one diverter member may include a recess that accommodates and provides clearance for a corresponding glide support member of the sash as it moves in the frame. The diverter members may robustly support the sash and may provide manufacturing advantages as will be discussed.

In some embodiments, the glide support member may include a rolling element, such as a wheel, etc., and/or the glide support member may be a slider block with a contoured slide support surface. The projection may be included on a pin that is fixed to the door. The glide support member and the projection may project from the sash peripheral area at respective fixed distances from the sash. As such, the fenestration unit may be accurately, reliably and repeatedly manufactured, installed for improved use and manufacture.

The fenestration unit may be closed with the operating sash robustly sealed to the frame to achieve high thermal performance, avoid forming a thermal bridge at a mullion, etc. The support system may also robustly support the operating sash for movement in the frame. The support system may facilitate movement, increase user-friendliness, etc. Moreover, the sash may be user-friendly and intuitive. The sash may move with relatively low resistance between its closed and open positions. Components and features of the support system may be highly manufacturable. Parts may be redundantly incorporated in the assembly for improved manufacturing efficiency. Also, the components may be relatively simple, inexpensive, and easy to install and replace.

Referring now to FIGS. 1-4, a fenestration unit 104 is illustrated according to example embodiments. In some embodiments, the fenestration unit 104 may be generally rectangular and flat with an inner side 102, an outer side 103, a first side 105, a second side 106, a top side 107, and a bottom side 108, which are discussed below for purposes of reference. In some embodiments, the fenestration unit 104 may be a window fenestration unit. In other embodiments, the fenestration unit 104 may a door fenestration unit (e.g., a patio door, a sliding or gliding door fenestration unit, etc.).

As shown in FIG. 1, the fenestration unit 104 may include a frame 110. The frame 110 may be assembled from a number of parts (e.g., extruded parts). A majority of these parts may be constructed from nylon, fiberglass, or polyvinyl chloride (PVC) material. The frame 110 may be generally rectangular with an elongate sill member 120 and elongate header member 122 (i.e., head jamb), which may extend longitudinally along a first axis 124 (e.g., longitudinal axis) to be parallel and separated along a second axis 126 (e.g., a vertical axis). The sill member 120 may substantially define the bottom side 108, and the header member 122 may substantially define the top side 107. The frame 110 may also include a first side jamb 128 at the first side 105 and a second side jamb 130 at the second side 106. The first and second side jambs 128, 130 may be elongate, may extend longitudinally along the second axis 126 to attach to the sill member 120 and header member 122. The first and second side jamb 128, 130 may be parallel and spaced apart along the first axis 124. The frame 110 may also define a third axis 127 (e.g., a lateral axis) that extends between the inner side 102 and the outer side 103 in an interior-exterior direction through the frame 110. Furthermore, in some embodiments, the frame 110 may include a mullion member 125, which may be elongate to extend parallel to the second axis 126 and may be spaced in an intermediate position along the first axis 124, substantially equally between the first and second side jambs 128, 130. The mullion member 125 may be fixed at both ends, respectively, to the sill member 120 and the header member 122.

It will be appreciated that the first axis 124, second axis 126, and third axis 127 may be perpendicular to each other and may collectively define a Cartesian coordinate system defined by the frame 110. However, it will be appreciated that the fenestration unit 104 may be configured differently without departing from the scope of the present disclosure. For example, in some embodiments, the first axis 124 may be a nonlinear or curved axis.

The fenestration unit 104 may also include a first sash 112 and a second sash 113 that are supported within the frame 110. The first sash 112 may include a panel 115 that is substantially flat and rectangular. The panel 115 may include a glazing unit 111 with one or more panes of glass supported within a panel frame 114. The second sash 113 may have corresponding features to the panel frame 114 and glazing unit 111.

Figure 4:
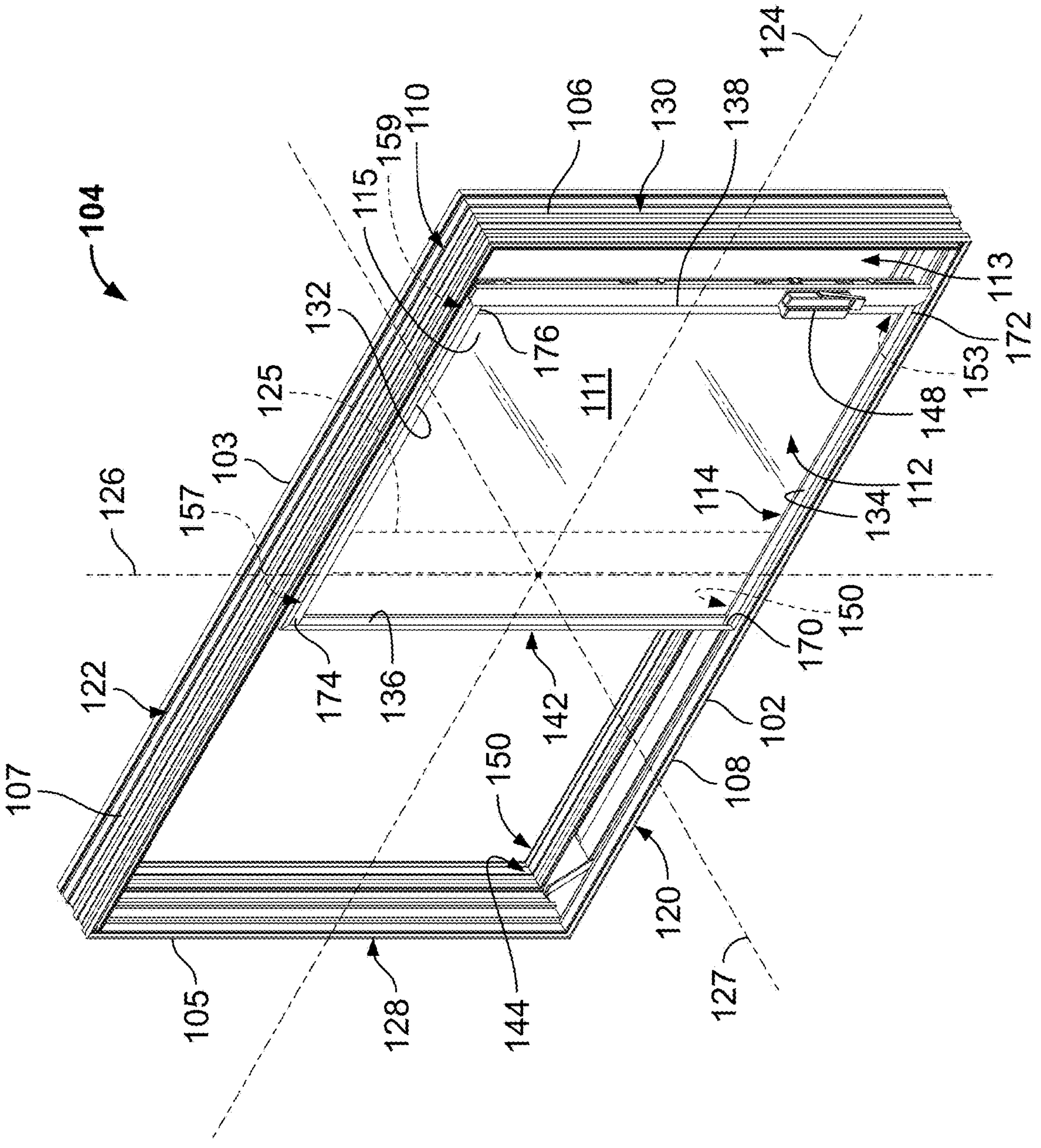
FIG. 4 is a perspective view of the fenestration unit of FIG. 1 with the sash in an open position according to example embodiments of the present disclosure.

As shown in FIG. 4, the panel frame 114 of the first sash 112 may be rectangular with an upper rail 132 that is disposed proximate the header member 122, a lower rail 134 that is disposed proximate the sill member 120, an outer jamb 136 that faces the first side jamb 128 along the first axis 124, and an inner jamb 138 that is spaced apart from the outer jamb 136 along the first axis 124. The lower rail 134 and the outer jamb 136 may meet and/or may be connected at an outer lower corner 170 of the panel frame 114, and the lower rail 134 may meet and/or may be connected at an inner lower corner 172 of the panel frame 114. The upper rail 132 may meet and/or connect to the outer jamb 136 and the inner jamb 138 at an upper outer corner 174 and an upper inner corner 176, respectively.

At least one of the sashes 112, 113 may be a moveable or active panel that is moveably supported within the frame 110. In some embodiments, for example, the first sash 112 may be moveably supported within the frame 110 and moveable between a closed position (e.g., FIG. 1) and an open position (e.g., FIG. 4), whereas the second sash 113 may be fixed within the frame 110. It will be appreciated, however, that other configurations of the fenestration unit 104 fall within the scope of the present disclosure (e.g., those with another number of panels, those with another combination of panels, etc.).

Also, in some embodiments, the fenestration unit 104 may include a latching system 146 for selectively latching and unlatching the first sash 112 in the closed position. The latching system 146 may include, may be associated with, may be operatively coupled to, etc. a user handle 148 disposed on or connected to the inner jamb 138.

In some embodiments, the fenestration unit 104 may be a gliding window or door unit (i.e., sliding window or door unit). As such, the first sash 112 may glide (i.e., slide) within the frame 110 and move substantially along the first axis 124 as the first sash 112 moves between the closed position (e.g., FIG. 1) and the open position (e.g., FIG. 4). As will be discussed, the first sash 112 may move somewhat along the third axis 127 (i.e., laterally) within the frame 110 when moving between the closed and open positions. Also, the first sash 112 may rotate within the frame 110 when moving between the closed and open positions.

In the closed position, the first sash 112 may be arranged in a side-by-side arrangement with the second sash 113. More specifically, the first sash 112 and the second sash 113 may be spaced apart along the first axis 124 with the mullion member 125 disposed therebetween. Also, the first sash 112 may be substantially co-planar with the second sash 113. When closed, a panel peripheral area 142 of the first sash 112 defined by the panel frame 114 may be seated against an opposing panel seat 144 of the frame 110. Furthermore, the panel peripheral area 142 of the first sash 112 and/or the panel seat 144 of the frame 110 may include weather-resistant sealing members, weatherstripping, resiliently compressible seals, etc. for substantially sealing the closed first sash 112 to the frame 110. Accordingly, the first sash 112 may be closed securely to provide a robust thermal barrier, a seal against intrusion of wind, rain, and other precipitation, etc.

In the open position of the first sash 112 (e.g., FIG. 4), the first sash 112 may be disposed adjacent the second side jamb 130. Also, the first sash 112 may overlap the second sash 113 within the frame 110 along the third axis 127. As shown in FIG. 4, the first sash 112 may be disposed closer to the inner side 102 of the fenestration unit 104 whereas the second sash 113 may be disposed closer to the outer side 103 when the first sash 112 is open.

Figure 2:
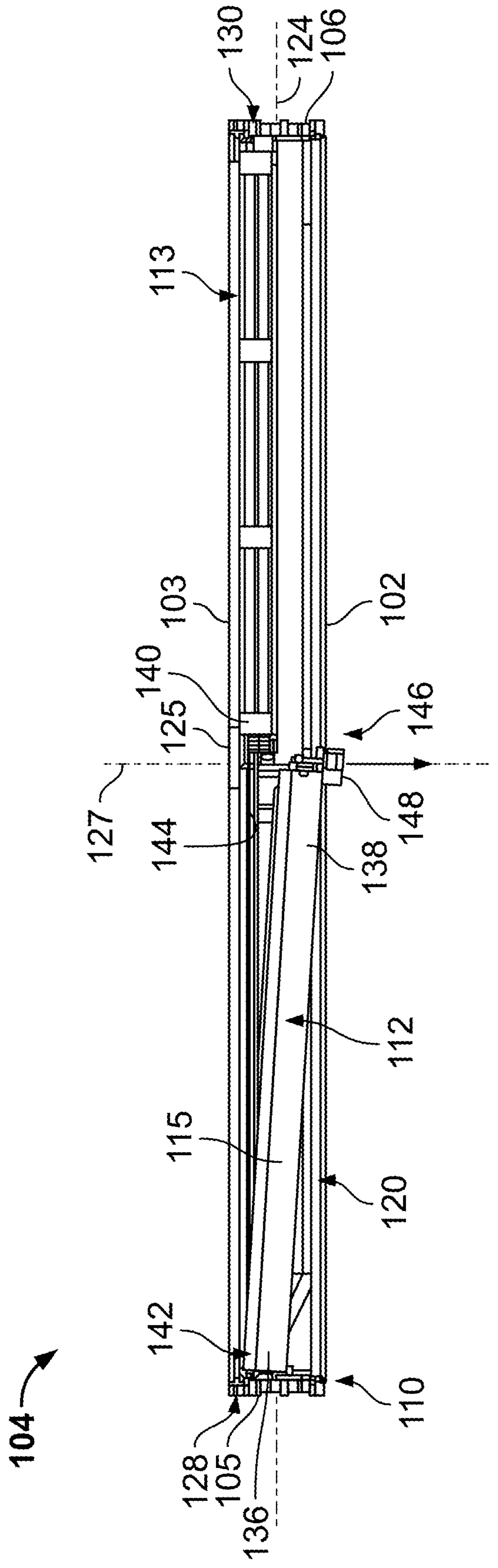
FIG. 2 is a top view of the fenestration unit of FIG. 1 with the sash in a first intermediate position according to example embodiments of the present disclosure.
Figure 3:
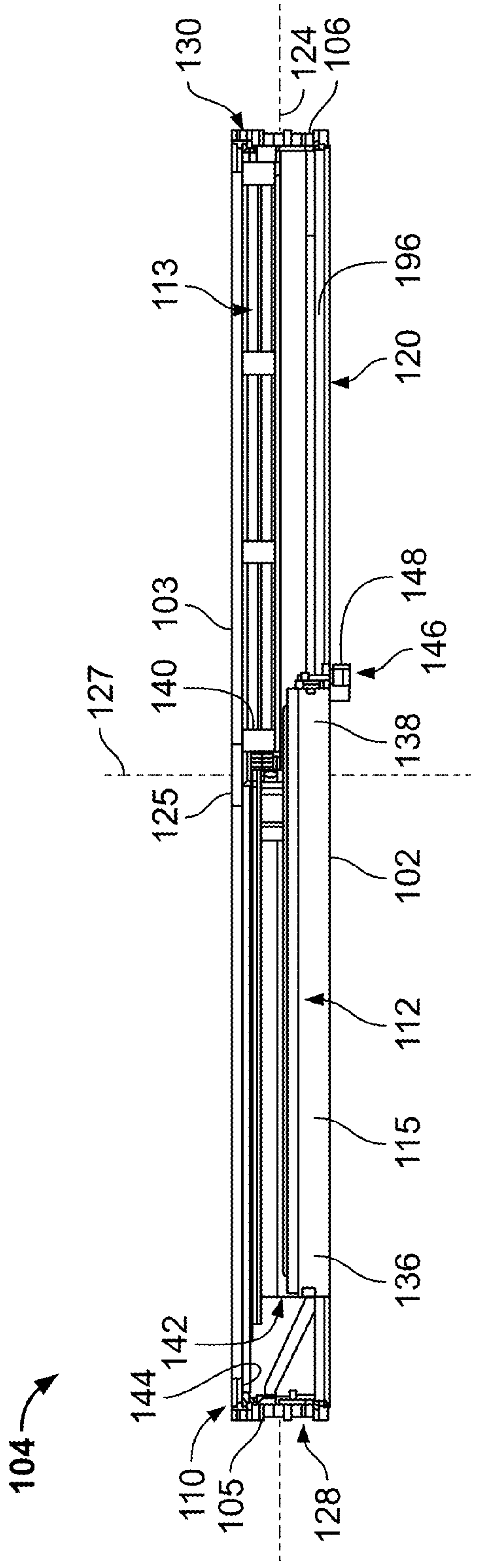
FIG. 3 is a top view of the fenestration unit of FIG. 1 with the sash in a second intermediate position according to example embodiments of the present disclosure.

As shown in FIGS. 2 and 3, the first sash 112 may also move through various intermediate positions within the frame 110 when moving between the closed position of FIG. 1 and the open position of FIG. 4. For example, the first sash 112 may have a first intermediate position disposed and defined between the closed and open positions represented in FIG. 2. The first sash 112 may also have a second intermediate position disposed and defined between the closed and open positions represented in FIG. 3.

In the pop-out intermediate position of FIG. 2, the outer jamb 136 may be disposed proximate the first side jamb 128 of the frame 110, but the inner jamb 138 may be spaced away from the mullion member 125 along the third axis 127. In other words, the first sash 112 may be rotated within the frame 110 about an axis that is parallel with the second axis 126 and that is aligned substantially with the outer jamb 136. To move the first sash 112 from the closed position to the pop-out intermediate position of FIG. 2, a user may pull on the handle 148 inwardly and laterally along the third axis 127. Conversely, the user may push on the handle 148 to move the first sash 112 back to the closed position.

In the diverted intermediate position of FIG. 3, the first sash 112 may be disposed within the frame and substantially disposed within a plane that is parallel with the first and second axes 124, 126. Also, the first sash 112 may be offset from the second sash 113 along the third axis 127. Accordingly, the first sash 112 may have clearance from the second sash 113 to glide (i.e., slide) within the frame 110 and overlap the second sash 113 as the first sash 112 moves between the diverted intermediate position of FIG. 3 and the open position of FIG. 4. The user may utilize the handle 148 to actuate the first sash 112 as such.

In an example sequence of opening the first sash 112 from the closed position of FIG. 1, the user may ensure the latching system 146 is unlatched, grasp the handle 148, pull the inner jamb 138 inward along the third axis 127 to move the sash 112 to the pop-out intermediate position of FIG. 2, and then the user may pull on the handle 148 substantially along the first axis 124 to glide (i.e., slide) the sash 112 to the diverted intermediate position of FIG. 3 and subsequently glide (i.e., slide) the sash 112 to the open position of FIG. 4. Conversely, to close the first sash 112, the first sash 112 may move, in sequence from the open position of FIG. 4, to the diverted intermediate position of FIG. 3, to the pop-out intermediate position of FIG. 2, to the closed position of FIG. 1. Then, the user may actuate the latching system 146 to a latched position to secure the sash 112 to the frame 110.

Figure 5A:
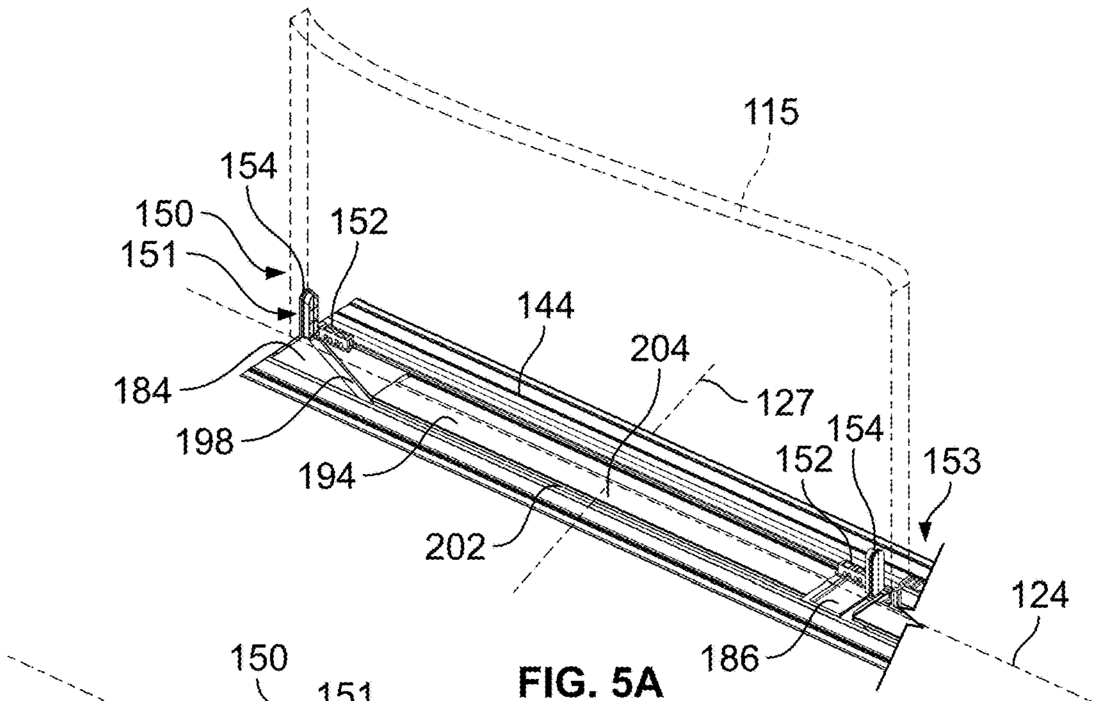
FIG. 5A is a perspective view of portions of the fenestration unit in the closed position of FIG. 1.
Figure 5B:
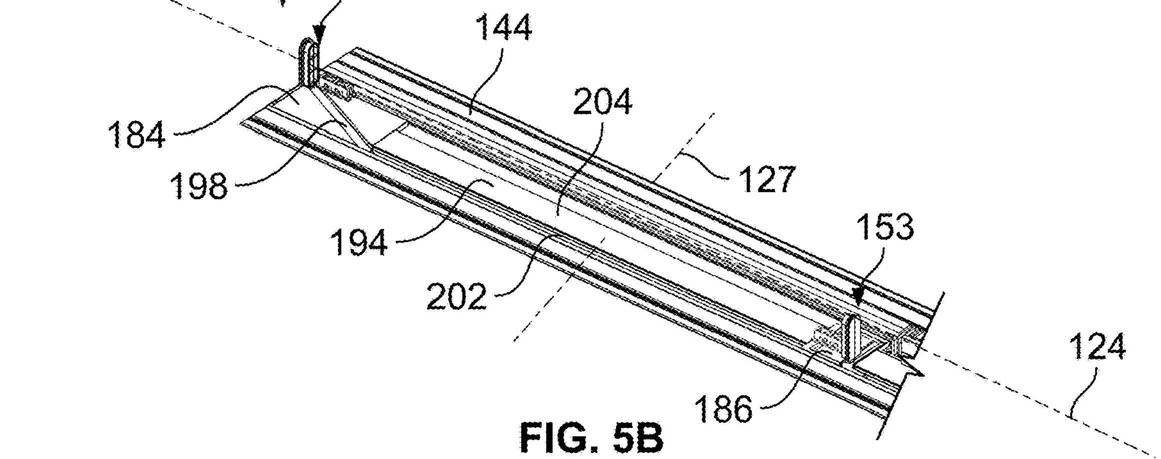
FIG. 5B is a perspective view of portions of the fenestration unit in the first intermediate position of FIG. 2.

Referring now to FIGS. 5A-9, additional features of the fenestration unit 104 that support the first sash 112 within the frame 110 will be discussed. For example, as shown in FIGS. 5A, 5B, and 5C, the fenestration unit 104 may include a sash support system 150 that moveably supports the first sash 112 within the frame. The panel 115 of the first sash 112 is shown in phantom to reveal various features of the support system 150. The support system 150 may include one or more components of the first sash 112 and complimentary components of the frame 110. These complimentary components may be operatively coupled together for moveably supporting the first sash 112 in the frame 110.

Figure 6A:
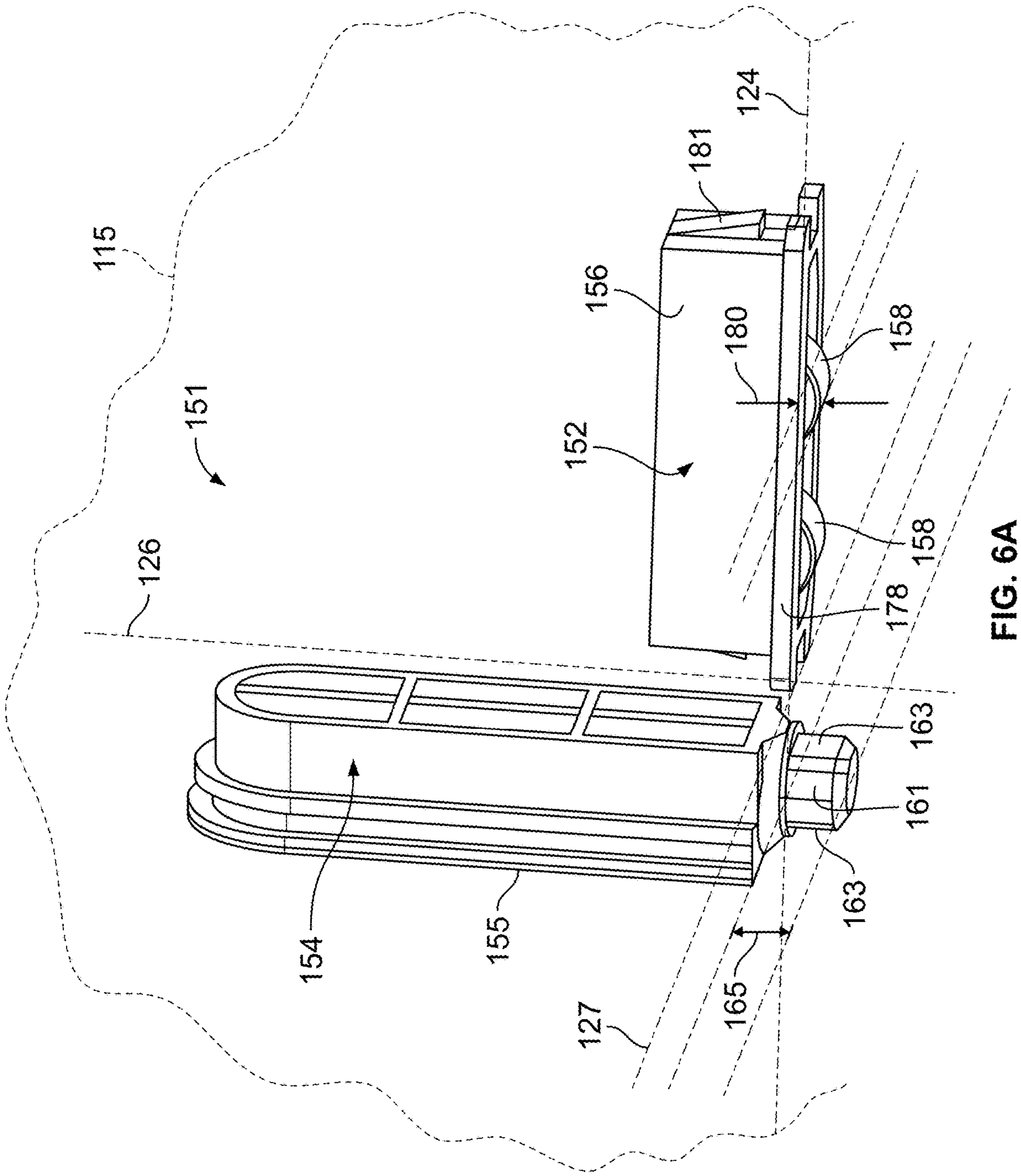
FIG. 6A is a perspective view of sash support members of the fenestration unit of FIG. 1.

For example, the support system 150 may include a first lower arrangement 151 of sash support members represented according to various embodiments in FIGS. 5A and 6A. The first arrangement 151 (i.e., outer support arrangement) may include a pin member 154 and a glide support member 152. As shown in FIG. 6A, the pin member 154 may be monolithic and constructed from a high-strength, tough material, such as metal or high-strength polymer. The pin member 154 may include an insert portion 155, which is elongate to be inserted and received within the lower rail 134 of the panel frame 114, proximate the outer lower corner 170. The pin member 154 may also include a projection 161 that projects along the second axis 126 at a first fixed distance 165 from the lower rail 134 of the panel 115. (The first axis 124 is represented in FIG. 6A to extend along the panel peripheral area 142 at the lower rail 134 for reference purposes.) The projection 161 may be somewhat cylindrical with relatively planar sides 163. The planar sides 163 may face in opposite directions substantially along the first axis 124. The glide support member 152 may include a hollow box-like housing 156 and one or more rolling elements 158 (e.g., wheels, ball-bearings, etc.) that are rotatably attached to the housing 156. The housing 156 may also include an outturned lip 178. The housing 156 may also include one or more resilient tabs 181 The housing 156 may be inserted and received within the lower rail 134 of the panel frame 114, proximate the outer lower corner 170 with the lip 178 substantially flush with the panel peripheral area 142. The tabs 181 may resiliently flex inward to allow insertion of the housing 156 into the lower rail 134 and, once inserted, the tabs 181 may resiliently recover and flex back outward to retain the housing 156 in the lower rail 134. The housing 156 may be disposed adjacent the pin member 154 along the first axis 124. The pin member 154 may be attached to the lower rail 134 further outboard along the first axis 124 (i.e., closer to the respective corners 170, 172) than the glide support member 152. Also, the pin member 154 and the glide support member 152 may be offset slightly along the third axis 127. The rolling elements 158 may be rotatably mounted within the housing 156. There may be plural (e.g., two) rolling elements 158 that are oriented to roll substantially along the first axis 124. Also, a minority portion of the rolling elements 158 may project from the lip 178 by a second fixed distance 180 along the second axis 126. Thus, the rolling elements 158 may project the second fixed distance 180 from the panel peripheral area 142 of the sash 112.

As shown in FIG. 5A, the support system 150 may further include a second lower arrangement 153 of sash support members. The second arrangement 153 may be substantially similar to the first arrangement 151 to include a respective pin member 154 and glide support member 152. However, the second arrangement 153 may be spaced apart along the first axis 124 from the first arrangement 151 to be disposed proximate the inner lower corner 172 of the panel frame 114. As indicated in FIG. 4, the first sash 112 may further include a first upper support arrangement 157 at the upper outer corner 174 and a second upper support arrangement 159 at the upper inner corner 176 of the panel frame 114. The first upper support arrangement 157 may be substantially similar to the first lower arrangement 151; however, the pin member 154 and glide support member 152 may be inverted to project outwardly (i.e., upwardly) from the upper rail 132. Likewise, the second upper support arrangement 159 may be similar to the second lower arrangement 153 and may be oriented to project upwardly from the upper rail 132.

Figure 6B:
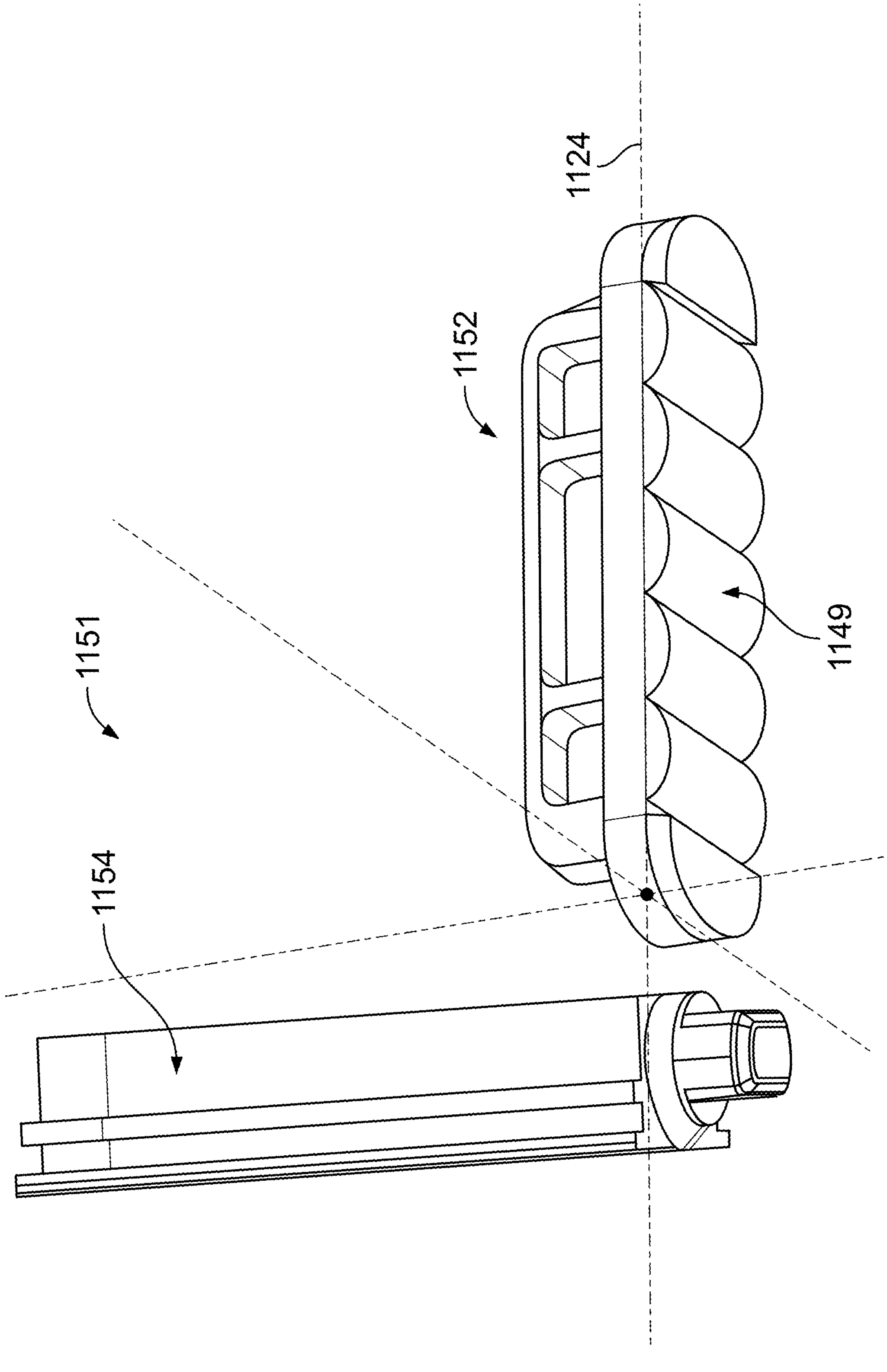
FIG. 6B is a perspective view of sash support members of the fenestration unit of FIG. 1 according to additional example embodiments of the present disclosure.

FIG. 6B illustrates additional embodiments of the arrangement 1151. The arrangement 1151 may be substantially similar to the embodiments of the arrangement 151 of FIG. 6A except as noted. Components that correspond to those of FIG. 6A are indicated with corresponding reference numbers increased by 1000. Redundant descriptions of common features will be omitted.

As shown in FIG. 6B, the arrangement 1151 may include a pin member 1154, which may be substantially the same as the pin member 154 of FIG. 6A. However, the glide support member 1152 may comprise a slide block with a contoured outer side 1149. The contoured outer side 1149 may be wavy, may include a series of convex bumps, and/or may define another surface configured for sliding support. It will be appreciated that the arrangement 1151 may be included in place of (or in addition to) the arrangement 151 of FIG. 6A. It will also be appreciated that the second lower arrangement 153, the first upper support arrangement 157, and/or the second upper support arrangement 159 (FIG. 4) may incorporate features of the arrangement 1151 of FIG. 6B. The following will refer to the sash 112 as including the arrangement 151, but it will be appreciated that the arrangement 1151 may be alternatively included in accordance with the following description.

Figure 7:
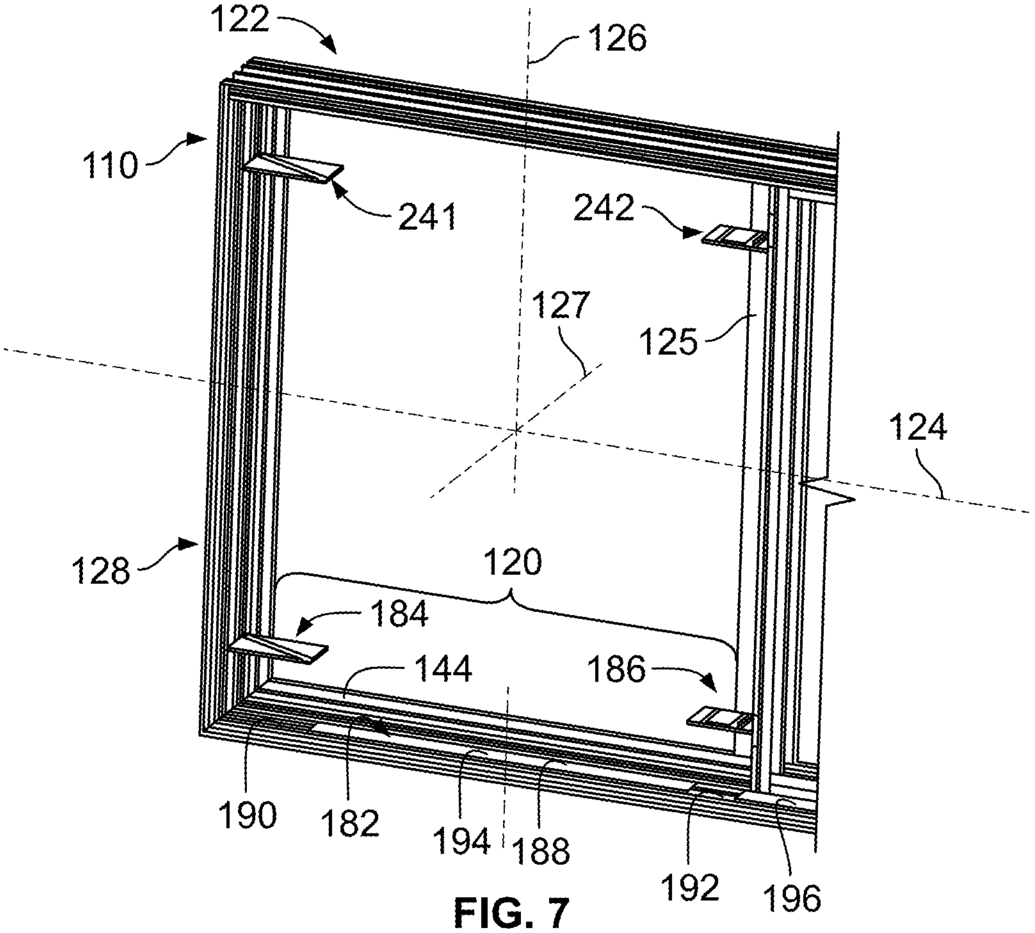
FIG. 7 is an exploded view of a frame of the fenestration unit of FIG. 1 according to example embodiments of the present disclosure.

Additional features of the support system 150 that are associated with the frame 110 are illustrated in FIG. 7 according to example embodiments. As shown, the sill member 120 may comprise an elongate sill 182, a first diverter member 184, and a second diverter member 186. In some embodiments, the elongate sill 182, the first diverter member 184, and the second diverter member 186 may be removably attached to cooperatively define at least part of the sill member 120.

The elongate sill 182 may be elongate to extend along the first axis 124 between the first side jamb 128 and the second side jamb 130. The elongate sill 182 may define a majority of the sill member 120. The elongate sill 182 may define an inner face 188, which generally faces inward (i.e., upward) along the second axis 126. The inner face 188 may be non-planar so as to define a first pocket 190 proximate the first side jamb 128 and a second pocket 192 proximate the mullion member 125. The inner face 188 may also include a first portion 194 disposed between the first pocket 190 and the second pocket 192 along the first axis 124. The inner face 188 may further include a second portion 196 (FIG. 1) that is disposed between the second pocket 192 and the second side jamb 130 along the first axis 124. As shown in FIG. 1, the inner face 188 may define a guide channel 202 that is substantially straight and parallel to the first axis 124. The guide channel 202 may extend from the first pocket 190, along the first portion 194, across the second pocket 192, and along the second portion 196. The inner face 188 may also define a glide support track 204, which may be an elongate, substantially flat and planar surface that is normal to the second axis 126. The glide support track 204 may extend along the first axis 124 from the first pocket 190, along the first portion 194, may be interrupted by the second pocket 192, and may extend along the second portion 196. The glide support track 204 and the guide channel 202 may be offset along the third axis 127 with the glide support track 204 disposed between the guide channel 202 and the panel seat 144 of the frame 110.

Figure 8:
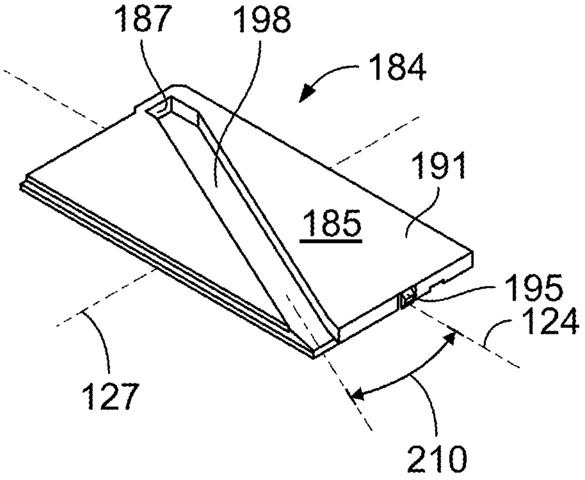
FIG. 8 is a perspective view of a first diverter member of the frame of FIG. 6.

As shown in FIG. 8, the first diverter member 184 may be a monolithic part that is constructed from tough polymer or metal. In some embodiments, for example, the first diverter member 184 may be constructed from PVC or reinforced composite PVC material. The first diverter member 184 may be relatively flat and rectangular with a non-planar upper face 185 that defines a first diverter channel 198. The first diverter channel 198 may extend longitudinally along a straight channel axis that is disposed at a positive angle 210 relative to the first axis 124. As such, the first diverter channel 198 may extend diagonally across the face 185 of the first diverter member 184 from one corner to another. The diverter channel 198 may include a terminal end 187 and an opposite end 189. The channel 198 may be closed to define a terminal boundary at the terminal end 187, whereas the channel 198 may be open at the opposite end 189. The face 185 may also include a smooth, flat, triangular glide surface 191 adjacent the channel 198. The first diverter member 184 may be removably received within the first pocket 190 as represented in FIG. 7. In some embodiments, the diverter member 184 may include resilient tabs 195 for a snap-fit coupling within the first pocket 190 to removably couple to the elongate sill 182. In additional embodiments, the diverter member 184 may be integrally attached to the elongate sill 182 so as to define a monolithic part of the sill member 120. As shown in FIG. 5A, when installed, the face 185 of the first diverter member 184 may be substantially flush, level, and even with the adjacent surface of the glide support track 204. Also, the terminal end 187 of the diverter channel 198 may be disposed adjacent the panel seat 144 of the frame 114, and the opposite end 189 may connect to (i.e., communicate with) the guide channel 202. Thus, the diverter channel 198 may extend longitudinally between the panel seat 144 and the guide channel 202. Disposed at the angle 210 (FIG. 8), the diverter channel 198 may extend along both the first axis 124 and along the third axis 127 to extend between the panel seat 144 and the guide channel 202.

Figure 9:
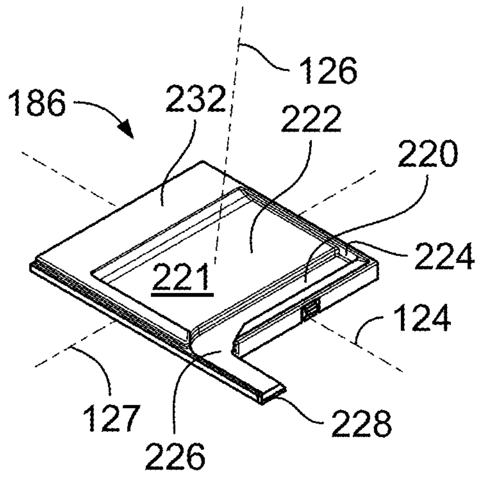
FIG. 9 is a perspective view of a second diverter member of the frame of FIG. 6.

As shown in FIG. 9, the second diverter member 186 may be a monolithic part that is constructed from tough polymer or metal. In some embodiments, for example, the second diverter member 186 may be constructed from PVC or reinforced composite PVC material. The second diverter member 186 may be relatively flat and rectangular with a non-planar upper face 221 that defines a second diverter channel 220 and a recess 222. Moreover, the second diverter channel 220 may extend longitudinally along a straight channel axis that is substantially parallel to the third axis 127. The second diverter channel 220 may include a terminal end 224 and an opposite end 226. The channel 220 may be closed to define a terminal boundary at the terminal end 224, whereas the channel 220 may be open at the opposite end 226. The second diverter member 186 may include an appendage 228 that extends and projects from the end 226 substantially parallel to the first axis 124. The thickness of the appendage 228 may match that of the end 226 so as to be smooth and flush therewith along the upper face 221. The recess 222 may be rectangular and may be disposed on the face 221 between the channel 220 and an inner edge portion 232 thereof. The recess 222 may be recessed along the second axis 126 relative to the inner edge portion 232 to a predetermined depth to provide clearance and freedom of movement for the sash 112 as will be discussed below. The second diverter member 186 may be removably received within the second pocket 192 as represented in FIG. 7. In some embodiments, the diverter member 186 may include resilient tabs 230 for a snap-fit coupling within the second pocket 192 to removably couple to the elongate sill 182. In additional embodiments, the diverter member 186 may be integrally attached to the elongate sill 182 so as to define a monolithic part of the sill member 120. As shown in FIG.

5A, when installed, the terminal end 224 of the diverter channel 220 may be disposed adjacent the panel seat 144 of the frame 114, and the opposite end 226 may connect to (i.e., communicate with) the guide channel 202. Thus, the diverter channel 220 may extend along the third axis 127 between the panel seat 144 and the guide channel 202. Furthermore, the appendage 228 may be received within the second portion 196 of the guide channel 202.

As shown in FIG. 7, the fenestration unit 104 may additionally include a first header diverter member 241 and a second header diverter member 242. The first header diverter member 241 may be substantially identical to the first diverter member 184; however, the first header diverter member 241 may be inverted and removably attached within the header member 122, proximate the first side jamb 128. Likewise, the second header diverter member 242 may be substantially identical to the second diverter member 186; however, the second header diverter member 242 may be inverted and removably attached within the header member 122, proximate the mullion member 125.

Accordingly, the sash support system 150 may robustly support the sash 112 within the frame 110 and allow the sash 112 to move as described above. The projections 161 may be received within and may travel within the diverter channels 198, 220 as the sash 112 moves laterally between the panel seat 144 and the guide channel 202. Furthermore, the diverter members 184, 186 may accommodate lateral movement of the glide support members 152 as the panel 112 moves laterally between the panel seat 144 and the glide support track 204.

Figure 5C:
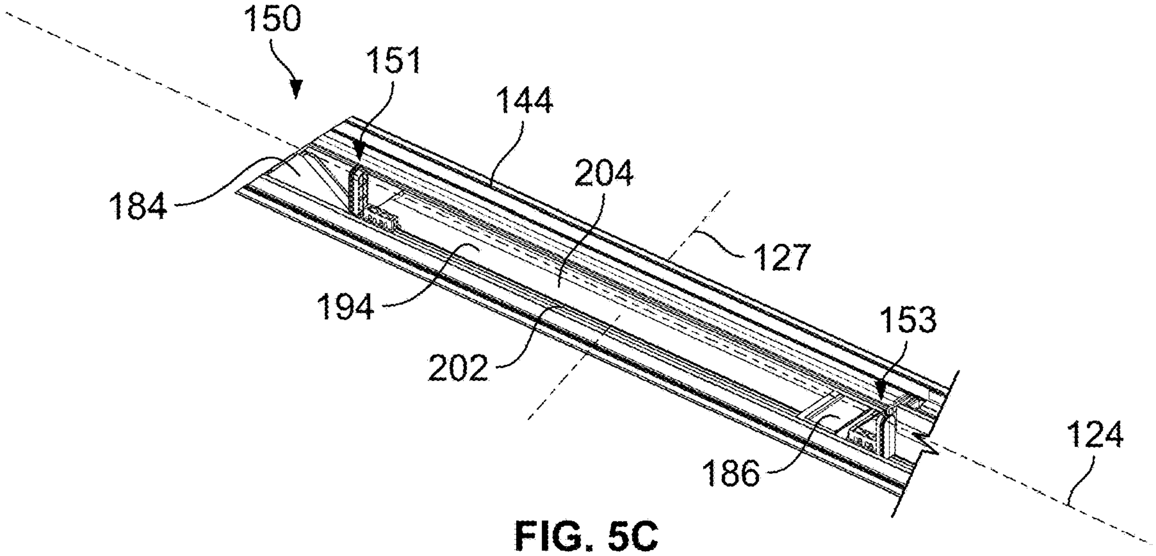
FIG. 5C is a perspective view of portions of the fenestration unit in the second intermediate position of FIG. 3.

More specifically, as shown in FIG. 5A, when the sash 112 is closed, the first lower arrangement 151 may be disposed over, may be coupled to, and/or may engage the first diverter member 184. Specifically, the projection 161 of the pin member 154 may be received in the first diverter channel 198, proximate the terminal end 187, and the rolling elements 158 of the glide support member 152 may be supported atop the triangular glide surface 191 of the first diverter member 184. As the sash 112 moves open, the projection 161 may rotate slightly about an axis parallel to the second axis 126 (FIG. 5B) and may advance along the first diverter channel 198 and move smoothly into the guide channel 202 (FIG. 5C). The rolling elements 158 may roll along the first axis 124 across the triangular glide surface 191 as the projection 161 advances along the first diverter channel 198 toward the guide channel 202. With the projection 161 fully in the guide channel 202 (FIG. 5C), the rolling elements 158 may be rollingly supported atop the first portion 194 of the glide support track 204. Thus, the rolling elements 158 may support the sash 112 on the track 204 for smooth and easy gliding (i.e., sliding) movement along the first axis 124 to the position of FIG. 4, and the projection 161 may be bound within the guide channel 202 to guide movement substantially along the first axis 124. It will be appreciated that the first header diverter member 241 (FIG. 7) may similarly support the first upper support arrangement 157 (FIGS. 1 and 4) of the sash 112.

Furthermore, as shown in FIG. 5A, when the sash 112 is closed, the second lower arrangement 153 may be disposed over, may be coupled to, and/or may engage the second diverter member 186. Specifically, the projection 161 of the pin member 154 may be received in the second diverter channel 220, proximate the terminal end 224, and the rolling elements 158 of the glide support member 152 may be received within the recess 222 of the second diverter member 186. As the sash 112 moves open, the projection 161 may advance along the second diverter channel 220 (FIG. 5B), and then may move smoothly into the guide channel 202 (FIGS. 2, 3, and 5C). The recess 222 may provide clearance for the glide support member 152 as the rolling elements 158 of the second lower arrangement 153 advances along the third axis 127. With the projection 161 fully in the guide channel 202 (FIG. 5C), the rolling elements 158 may be rollingly supported atop the second portion 196 of the glide support track 204. Thus, the rolling elements 158 may support the sash 112 on the track 204 for smooth and easy gliding (i.e., sliding) movement along the first axis 124 to the position of FIG. 4, and the projection 161 may be bound within the guide channel 202 to guide movement substantially along the first axis 124. It will be appreciated that the second header diverter member 242 (FIG. 7) may similarly support the second upper support arrangement 159 (FIGS. 1 and 4) of the sash 112. It will be appreciated that the sash support system 150 may similarly provide user friendly and robust support for movement of the sash 112 back from the open position (FIG. 4) to the closed position (FIG. 1).

Accordingly, the sash support system 150 of the fenestration unit 104 may be included for robustly supporting movement of the sash 112. The sash 112 may be closed to define a strong thermal and environmental barrier. The sash 112 may be easily moved with relatively low resistance/friction. Also, the components of the system 150 may be highly manufacturable. Parts may be redundantly included in the fenestration unit 104 for increasing manufacturing efficiency. Additionally, the components may be relatively simple, inexpensive, and easy to install and replace. Moreover, the glide support member 152, 1152 and the projection 161, 1161 may project from the sash 112 at respective fixed distances 165, 180 therefrom. As such, the support system 150 may be accurately, reliably and repeatedly manufactured and installed for improved use and manufacture of the fenestration unit 104.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It is understood that various changes may be made in the function and arrangement of elements described in an exemplary embodiment without departing from the scope of the disclosure as set forth in the appended claims.

What is claimed is:

1. A fenestration unit comprising:

a frame that defines a first axis, a second axis, and a third axis, the third axis extending through the frame, and the third axis being perpendicular to the first axis;

a sash supported for movement within the frame between a first position and a second position, the sash being displaced along the first axis during movement between the first position and the second position, the sash having an intermediate position in which the sash is disposed in the frame between the first position and the second position;

the sash including a panel peripheral area, a glide support member that projects a first fixed distance from the panel peripheral area along the second axis, and a projection that projects a second fixed distance from the panel peripheral area along the second axis;

the frame including a frame member that is elongate and extends along the first axis, the frame member at least partly defining a panel seat that opposes the panel peripheral area when the sash is in the first position, a support track configured to engage and support the glide support member for gliding movement of the sash between the intermediate position and the second position, and a guide channel that receives the projection to guide gliding movement of the sash between the intermediate position and the second position, the frame member including a diverter channel extending between the panel seat and the guide channel and configured to receive the projection to guide movement of the sash between the first position and the intermediate position, the frame member including a recess providing clearance between the frame member and the glide support member as the sash moves between the first position and the intermediate position.

2. The fenestration unit of claim 1, wherein the sash is a first sash, and further comprising a second sash supported in the frame, the first sash supported for movement relative to the second sash, the first sash, in the first position, being in a side-by-side arrangement with the second sash, the first sash, in the second position, overlapping the second sash along the third axis.

3. The fenestration unit of claim 2, wherein the second sash is fixedly supported within the frame.

4. The fenestration unit of claim 3, wherein the frame further includes a mullion member that is disposed between the first sash and the second sash along the first axis when the first sash is in the first position.

5. The fenestration unit of claim 1, wherein the first sash includes a bottom rail, and wherein the panel peripheral area is included on the bottom rail.

6. The fenestration unit of claim 5, wherein the first sash includes a jamb that is attached to the bottom rail at a corner of the first sash, and wherein the glide support member and the projection are disposed adjacent the corner.

7. The fenestration unit of claim 5, wherein the diverter channel is elongate to extend substantially parallel to the third axis.

8. The fenestration unit of claim 5, wherein the diverter channel is elongate to extend at a positive angle relative to the first axis.

9. The fenestration unit of claim 1, wherein the glide support member includes a rolling element configured to roll along the support track, the recess configured to provide clearance for the rolling element as the sash moves between the first position and the intermediate position.

10. The fenestration unit of claim 1, wherein the glide support member includes a fixed glide surface configured to slide along the support track, the recess configured to provide clearance for the fixed glide surface as the sash moves between the first position and the intermediate position.

11. The fenestration unit of claim 1, wherein the frame member is a sill member, the sill member including an elongate sill and a diverter member that are removably attached, the diverter member including the diverter channel and the recess.

12. The fenestration unit of claim 11, wherein the diverter member is removably snap-fit to the elongate sill.

13. The fenestration unit of claim 11, wherein the diverter member is a first diverter member and wherein the frame further includes a second diverter member that is removably attached to the elongate sill on an end opposite that of the first diverter member;

wherein the glide support member is a first glide support member, and wherein the sash includes a second glide support member spaced apart from the first glide support member along the first axis;

wherein the projection is a first projection configured to engage the first diverter member, and wherein the sash includes a second projection configured to engage the second diverter member to guide movement of the sash between the open and closed positions.

14. The fenestration unit of claim 1, wherein the frame is rectangular, the first axis is straight, the second axis is straight and perpendicular to the first axis, and the third axis is straight and perpendicular to the second axis.

15. The fenestration unit of claim 1, wherein the glide support member includes a rolling element configured to rollingly engage the support track.

16. The fenestration unit of claim 1, wherein the glide support member includes a slide block with a contoured side configured to slidingly engage the support track.

17. A method of manufacturing a fenestration unit comprising:

providing a frame that defines a first axis, a second axis, and a third axis, the third axis extending through the frame, and the third axis being perpendicular to the first axis;

supporting a sash for movement within the frame between a first position and a second position, the sash being displaced along the first axis during movement between the first position and the second position, the sash having an intermediate position in which the sash is disposed in the frame between the first position and the second position;

the sash including a panel peripheral area, a glide support member that projects a first fixed distance from the panel peripheral area along the second axis, and a projection that projects a second fixed distance from the panel peripheral area along the second axis;

the frame including a frame member that is elongate and extends along the first axis, the frame member at least partly defining a panel seat that opposes the panel peripheral area when the sash is in the first position, a support track configured to engage and support the glide support member for gliding movement of the sash between the intermediate position and the second position, and a guide channel that receives the projection to guide gliding movement of the sash between the intermediate position and the second position, the frame member including a diverter channel extending between the panel seat and the guide channel and configured to receive the projection to guide movement of the sash between the first position and the intermediate position, the frame member including a recess providing clearance between the frame member and the glide support member as the sash moves between the first position and the intermediate position.

18. A fenestration unit comprising:

a rectangular frame that defines a first axis, a second axis, and a third axis, the third axis extending through the frame, the third axis being straight and perpendicular to the first axis, the third axis being perpendicular to the second axis;

a sash supported for movement within the frame between a closed position and an open position, the sash being displaced along the first axis during movement between the closed position and the open position, the sash having an intermediate position in which the sash is disposed in the frame between the closed position and the open position;

the sash including a rectangular panel with a panel peripheral area that includes a first corner and a second corner that are separated along the first axis, the sash including a first glide support member and a first projection disposed proximate the first corner, the sash including a second glide support member and a second projection disposed proximate the second corner, the first glide support member, the first projection, the second glide support member, and the second projection projecting a respective fixed distance from the panel peripheral area along the second axis;

the frame including a sill member that is elongate and extends along the first axis, the sill member at least partly defining a panel seat that opposes the panel peripheral area when the sash is in the closed position, a support track configured to engage and support the first glide support member and the second glide support member for gliding movement of the sash between the intermediate position and the open position, and a guide channel that receives the first projection and the second projection to guide gliding movement of the sash between the intermediate position and the open position;

the sill member including a first diverter member with a first diverter channel that is elongate to extend substantially parallel to the third axis between the panel seat and the guide channel and configured to receive the first projection to guide movement of the sash between the closed position and the intermediate position, the first diverter member including a recess providing clearance between the frame member and the first glide support member as the sash moves between the closed position and the intermediate position; and the sill member including a second diverter member with a second diverter channel that is elongate to extend at a positive angle relative to the first axis between the panel seat and the guide channel and configured to receive the second projection to guide movement of the sash between the closed position and the intermediate position.

19. The fenestration unit of claim 18, wherein the glide support member includes a rolling element configured to roll along the support track, the recess configured to provide clearance for the rolling element as the sash moves between the first position and the intermediate position.

20. The fenestration unit of claim 18, wherein the glide support member includes a fixed glide surface configured to slide along the support track, the recess configured to provide clearance for the fixed glide surface as the sash moves between the first position and the intermediate position.

* * * * *